United States Patent [19]

Berkowitz et al.

[11] Patent Number: 5,588,051
[45] Date of Patent: Dec. 24, 1996

[54] METHOD FOR DYNAMICALLY PROVISIONING TELEPHONE SERVICE

[75] Inventors: Gary M. Berkowitz, Morganville; Thomas H. Daugherty, Succasunna; Rand J. Edwards, Chester; S. Mark Klerer, Edison; Lyla R. Meader, Chatham Township, Morris County, all of N.J.; Cary A. Strohecker, Sr., Alpharetta, Ga.

[73] Assignee: Lucent Technologies Inc., Murray Hill, N.J.

[21] Appl. No.: 318,413

[22] Filed: Oct. 5, 1994

[51] Int. Cl.$^6$ ............................ H04M 3/00; H04M 5/18
[52] U.S. Cl. ...................... 379/243; 379/246; 379/188; 379/88
[58] Field of Search .................... 379/120, 36, 188, 379/191, 196, 197, 201, 207, 218, 230, 231, 232, 234, 243, 244, 245, 246, 67, 88, 89

[56] References Cited

U.S. PATENT DOCUMENTS

| | | | |
|---|---|---|---|
| 5,012,466 | 4/1991 | Buhrke et al. | 370/62 |
| 5,012,511 | 4/1991 | Haule et al. | 379/211 |
| 5,060,255 | 10/1991 | Brown | 379/67 |
| 5,101,400 | 3/1992 | Krantz | 379/246 X |
| 5,355,405 | 10/1994 | Bernstein | 379/246 |
| 5,416,833 | 5/1995 | Harper et al. | 379/201 |
| 5,428,679 | 6/1995 | French | 379/201 |

OTHER PUBLICATIONS

"Networks Without Bounds", IEEE 1992 Network Operations and Management Symposium, Symposium Record, Mike Ahrens, vol. 2 of 3, pp. 36–45 Dec. 1992.

"Potential Future Applications of Direct, Automated Service Activation", Mike Ahrens, Journal of Network and Systems MAnagement, vol. 1, In. 1, Mar. 1993.

*Primary Examiner*—Krista M. Zele
*Assistant Examiner*—Scott L. Weaver
*Attorney, Agent, or Firm*—Frederick B. Luludis

[57] ABSTRACT

An operations facility is provided for administering unsubscribed telephone lines and conserving the use of the phone numbers associated with such lines by associating a plurality of unsubscribed lines with the same telephone number and same switch line termination point. Advantageously, then, a plurality of unsubscribed lines may be inexpensively provisioned with soft dial tone, thereby allowing a potential telephone subscriber to interactively subscribe to and activate telephone service from an unsubscribed line. Moreover, the application of soft dial tone may be used to identify a network access endpoint that is being used by a customer, and thus improve the accuracy of the contents of databases used by the operations facility in the provisioning of telephone service by identifying incorrect data.

17 Claims, 5 Drawing Sheets

FIG. 1

PRIOR ART

| CRV NO. (301) | SERIAL NO. / NUI PORT (302) | 300 |
|---|---|---|
| 305 — CRV$_1$ | SN$_1$/1 | |
| 306 — CRV$_2$ | SN$_1$/2 | |
| ⋮ | ⋮ | |
| CRV$_j$ | SN$_k$/1 | |
| | SN$_k$/2 | 307 |
| ⋮ | ⋮ | |
| CRV$_j$ | SN$_k$/n | |

FIG. 4

| SERIAL NO. / NUI PORT (303) | STATE | TYPE (304) | 325 |
|---|---|---|---|
| 307 — SN$_1$/1 | OFF HOOK | SUBSCRIBED SERVICE | |
| 308 — SN$_1$/2 | ON HOOK | SUBSCRIBED SERVICE | |
| ⋮ | ⋮ | ⋮ | |
| SN$_k$/1 | IDLE | UNSUBSCRIBED SERVICE | |
| SN$_k$/2 | IN USE | UNSUBSCRIBED SERVICE | |
| ⋮ | IDLE | UNSUBSCRIBED SERVICE | |
| SN$_p$/n | IDLE | UNSUBSCRIBED SERVICE | |

METHOD FOR DYNAMICALLY PROVISIONING TELEPHONE SERVICE

TECHNICAL FIELD

The invention relates to telecommunication network and more particularly relates to the provisioning of telephone service in an access network.

BACKGROUND OF THE INVENTION

Telecommunication networks that support telephone service typically include, inter alia, local central office switches that route telephone calls, Operations Systems (OS) that perform telephone service provisioning and maintenance functions, and access networks (commonly referred to as the "local loop plant") that interconnect a telephone switch with terminal equipment located at a customer's premises. The endpoints of an access network, more particularly, interface with customer terminal equipment, e.g., a telephone station set, via respective telephone lines. A telephone switch in a central office includes an interface unit comprising line termination points, also called switch ports. Each line termination point that is in service (i.e., assigned to a subscriber) is associated, via the provisioning process, with a unique telephone number served by the telephone switch. The provisioning process also associates each such telephone number with a class of service, e.g., Plain Old Telephone Service (POTS). Thus, the association between a telephone line and a class of service is predicated on an association existing between the telephone line and a switch line termination port. Such associations are typically recorded in OS databases.

To provision telephone service at the premises of a particular customer, an available (unsubscribed) telephone line extending to those premises is associated with a particular switch port, a unique telephone number and a particular class of service. One major difficulty in the provisioning process is maintaining accurate data records detailing which telephone lines are connected to which customer equipment so as to be able to identify which telephone lines are in service (associated with a line termination point, as mentioned above) and which telephone lines are not in service (unsubscribed). This requirement is difficult to meet in view of the fact that the local loop plant is often being re-arranged responsive to requests for new service, in which telephone lines extending to new subscribers are interconnected (associated) via an access network with respective switch ports. If the accuracy of the data representing such associations is not maintained, then the provisioning of telephone service becomes labor intensive—i.e., dispatching a craftsperson to identify the telephone line that is present at a customer's premises.

Soft dial tone, also known as limited access dial tone, is a class of telephone service that may be associated with an unsubscribed telephone line. Such a service allows a user to place a telephone call via an unsubscribed telephone line to a restricted set of destination telephone numbers including, for example, 911 for emergency services and 611 for telephone subscription services. It can be appreciated then that soft dial tone service is not a billed service, and, because of that fact, telephone calls directed to a soft-dial-tone line are blocked at the central office switch.

As is well-known, a person may obtain telephone service by dialing the telephone number of the local telephone service bureau, for example 611, and interact with an agent of the local telephone company. As a result thereof, the agent creates a service order defining the requested service, which, in turn, causes a so-called work order to be created. The work order, which might take several days to complete, includes information that (a) identifies which unsubscribed telephone line is present at the identified premises, (b) associates the identified telephone line with a port in the associated local switch and (c) associates the port with a unique telephone number. Such associations are made electronically from an operations center using a so-called Recent Change command. Some associations in the local loop plant may be made remotely and electronically, while others are implemented manually by a craftsperson at the termination point.

As mentioned above, a person may order telephone service via an unsubscribed telephone line. One local telephone company (Bell South) provides soft dial tone on selected unsubscribed telephone lines so that a person may dial the telephone number of the service bureau, for example 611, from an unsubscribed telephone line to order telephone service. In such an instance, the provisioning process proceeds quickly and the dispatch of a craftsperson is generally not needed. However, a number of problems are associated with providing soft-dial-tone service to unsubscribed telephone lines. These problems include increased administration costs and inefficient use of switch ports, and result from associating each unsubscribed line with a respective telephone number. Moreover, soft-dial-tone service is not provided on all unsubscribed telephone lines. The reason for this is that, in a typical case, the number of unsubscribed telephone lines associated with a particular outside loop plant exceeds the number of available (idle) ports serving that loop plant and also exceeds the number of available telephone numbers. Accordingly, only unsubscribed lines connected to switch ports are accorded soft-dial-tone service.

SUMMARY OF THE INVENTION

We have recognized that, in the case of unsubscribed telephone lines, the use of telephone numbers may be conserved and the operations cost of administering these numbers may be greatly reduced by, in accord with the invention, associating a plurality of unsubscribed lines with the same telephone number and same switch port. Advantageously, then, many unsubscribed lines may be inexpensively provisioned with soft dial tone, thereby allowing a potential telephone subscriber to interactively subscribe to and activate telephone service from an unsubscribed line.

In addition, use of soft dial tone, in accord with the invention, identifies the network access endpoint that is being used by a customer and hence improves the accuracy of the contents of the databases used by the operations systems in the provisioning of telephone service by identifying incorrect records.

DETAILED DESCRIPTION

Figure 1:
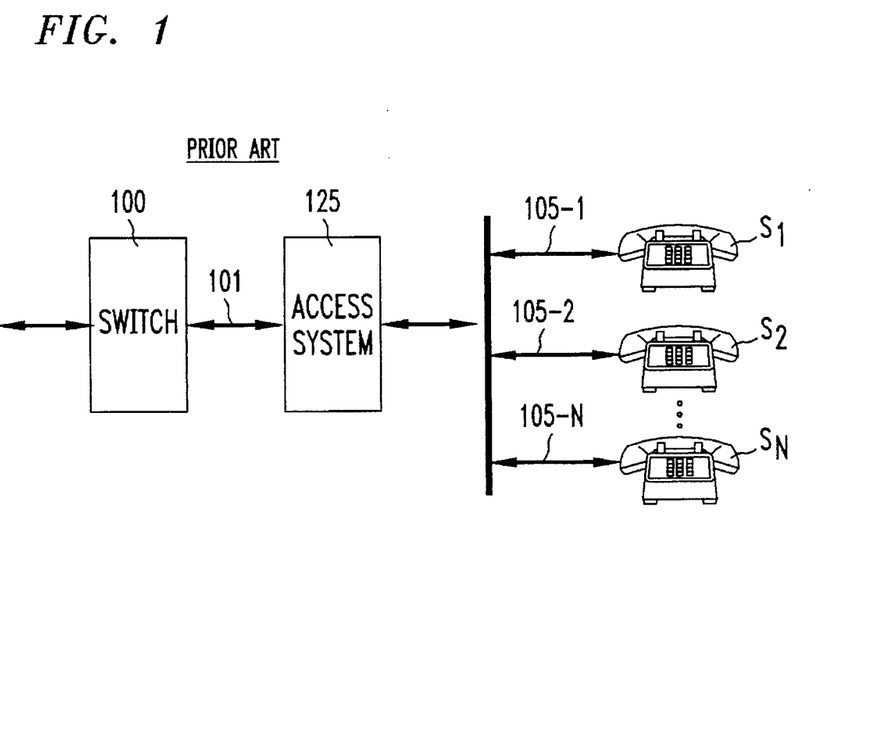
FIG. 1 is a broad block diagram of a prior art telecommunications system arranged to provide what is commonly referred to as soft dial tone.

In the prior art arrangement of FIG. 1, a conventional local telephone switch 100 connects via communications path 101 to access system 125 which, in turn, connects to a plurality of telephone lines 105 serving station sets S1 through SN. If one of the station sets, e.g., S1, is placed in an off-hook state for the purpose of placing a telephone call, then an off-hook signal is presented to access system 125 via line 105-1. Access system 125, responsive thereto, identifies the active line 105-1 by a unique Call Reference Value (CRV) (discussed below) and sends that value to switch 100. Switch 100, in turn, uses the CRV value and information (identity) relating to the switch 100 resources, e.g., switch 100 module number and interface unit number (trunk) involved in receiving the call from station S1 to form what is commonly referred to as an Originating Equipment (OE) number uniquely identifying the switch port. Switch 100 then translates the latter number into the telephone number assigned to the line serving station S1. Switch 100 then uses the telephone number for billing purposes and to assign a segment of the bandwidth of path 101 to the associated CRV. Switch 100 then sends the identity of the assigned bandwidth to access system 125. Thus, in order to obtain telephone service, a telephone line needs to be associated with a telephone number and a CRV unique to access system 125.

When soft dial tone is supplied to an unsubscribed telephone line, a CRV and a telephone number must also be associated with that line. The reason for this is that, for billing purposes, switch 100 has to associate a telephone call with a telephone number even though billing may not actually be imposed, as would be the case for soft dial tone. Accordingly, the prior art associates an unsubscribed telephone line with a CRV and telephone number for the purpose of being able to supply soft dial tone to the line responsive to receiving an off-hook signal from the line. As a result, the way in which soft dial tone was priorly provisioned made inefficient use of a limited resource, namely telephone numbers.

We deal with this problem and achieve an advancement in the pertinent art by associating a plurality of unsubscribed telephone lines with the same CRV and the same telephone number.

Figure 2:
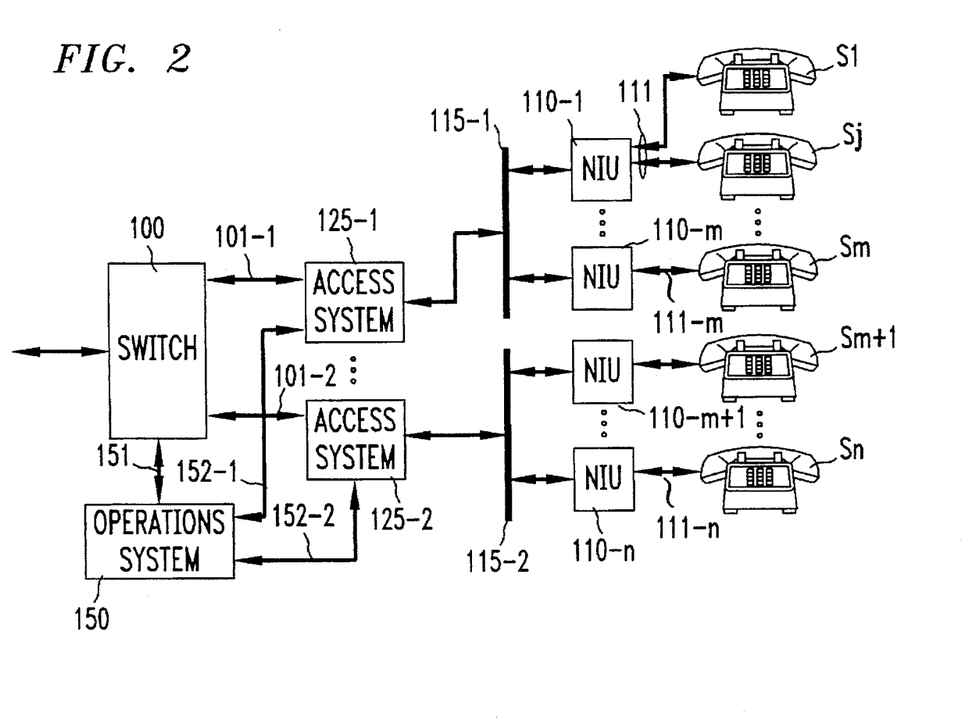
FIG. 2 is a broad block diagram of a telecommunications system arranged in accordance with the principles of the invention.

Turning then to FIG. 2, there is shown a broad block diagram of the local loop plant serving telephone switch 100 and Operations System (OS) 150 arranged in accord with the principles of the invention. The local loop plant includes, inter alia, a plurality of Access Systems (AS), two of which are shown in the FIG., namely AS 125-1 and AS 125-2, which connect to switch 100 via communications paths 101-1 and 101-2, respectively. In an illustrative embodiment of the invention, paths 101-1 and 101-2 may be any one of the well-known types of digital communications paths such as optical fiber, T1 carrier, etc. Access systems 125-1 and 125-2 also connect to OS 150 via digital communications paths 152-1 and 152-2, respectively, in which paths 152-1 and 152-2 operate in accord with a particular communications protocol, for example, the X.25 protocol.

Each access system 125 also connects to one or more shared bandwidth distribution busses 115 as a way of multiplexing (cross connecting) telephone calls between switched accessed communications path 101 and a telephone line extending via an associated Network Interface Unit (NIU) 110 to a telephone station set. In an illustrative embodiment of the invention, a bus 115 may be, for example, a coaxial bus distribution system. Telephone calls that originate or terminate at any one of the telephone stations sets S1 through Sm and/or Sm+1 through Sn, connect to their associated bus 115 via a respective NIU 110-1 through 110-n. A NIU may interface a number of telephone lines with the associated bus 110, as is shown for NIU 110-1 serving lines 111, in which each line may be connected to a conventional telephone station set or some other communications device, e.g., a workstation or a video device.

Each NIU 110, more particularly, performs a number of different functions including the multiplexing of signals between its associated bus 115 and associated telephone lines. Such functions also include (a) converting analog signals received from a station set into a signal format suitable for presentation to the associated bus 115 and vice versa, and (b) acting as a signaling interface between one of its associated station sets, e.g., S1, and associated access system, e.g., 125-1, and ultimately switch 100.

Figure 3:
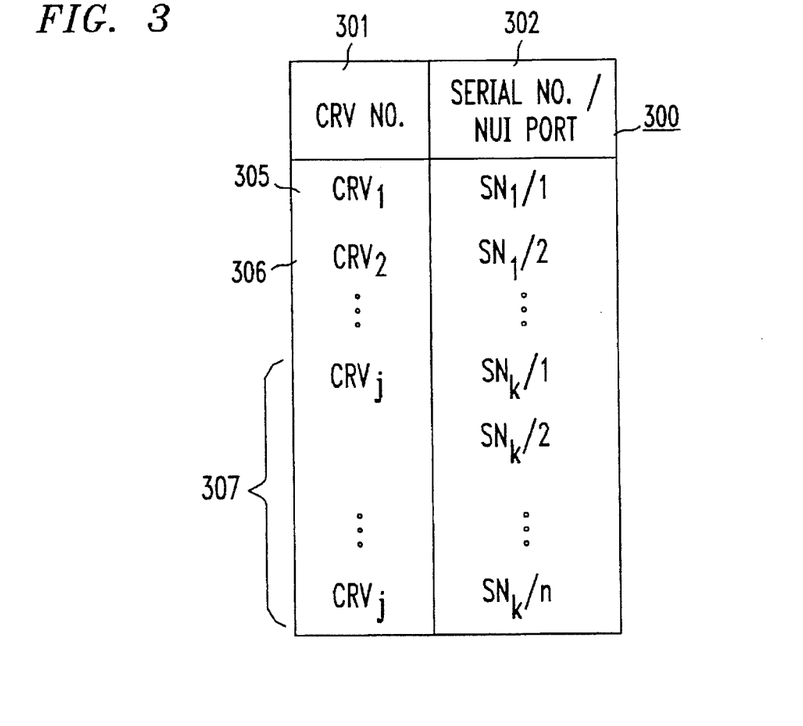
FIG. 3, illustrates a table that may be used to translate the address of a port of a Network Interface Unit (NIU) of FIG. 2 into a Call Reference Value.

An NIU, e.g., NIU 110-1, responds to an off-hook signal (incoming call) from a telephone set by forming a message containing its unique logical identifier and the identifier assigned to the port circuit receiving the off-hook signal. NIU 110-1 then sends the message to its associated access system 125-1 via the associated bus 115-1. Access system 125-1, in turn, maps the identifying information contained in the message into a CRV. If the identifying information is associated with a subscribed telephone line, then the information is mapped into a CRV dedicated to that telephone line. If the identifying information, on the other hand, is associated with an unsubscribed telephone line, then, in accord with an aspect of the invention, the information is mapped into a CRV common to a plurality of unsubscribed telephone lines served by access system 125-1. An illustrative example of a translation table that may be used to perform such mapping is shown in FIG. 3.

Specifically, table 300 is stored in the memory of the associated access system 125 and comprises a plurality of fields including fields 301 and 302 to form a number of line entries associated with respective NIU ports. For example, fields 302 of line entries 305 and 306 contains the identities of ports 1 and 2 of the NIU of serial number SN1, respectively, field 301 thereof contains the CRV values respectively associated with those ports. As such, field 301 maps the identity contained in the associated field 302 into a CRV value, in which the CRV value is unique for an associated subscribed line. For example, FIG. 3 indicates that only the identity of port 1 of NIU SN1 maps into the CRV1 value contained in field 301 of line 305, associated with at least one subscribed telephone line. Fields 302 of entries 307, on the other hand, are associated with unsubscribed telephone lines (as determined from table 325) and, therefore, in accord with an aspect of the invention, map into a common CRV value (i.e., CRVj), as shown by the entry in the associated field 301. Accordingly, based on the contents of table 300, a telephone line having a subscribed status maps into a unique CRV, whereas a telephone line having an unsubscribed status (i.e., soft dial tone) maps into one or more shared CRVs, i.e., CRVj.

Figure 4:
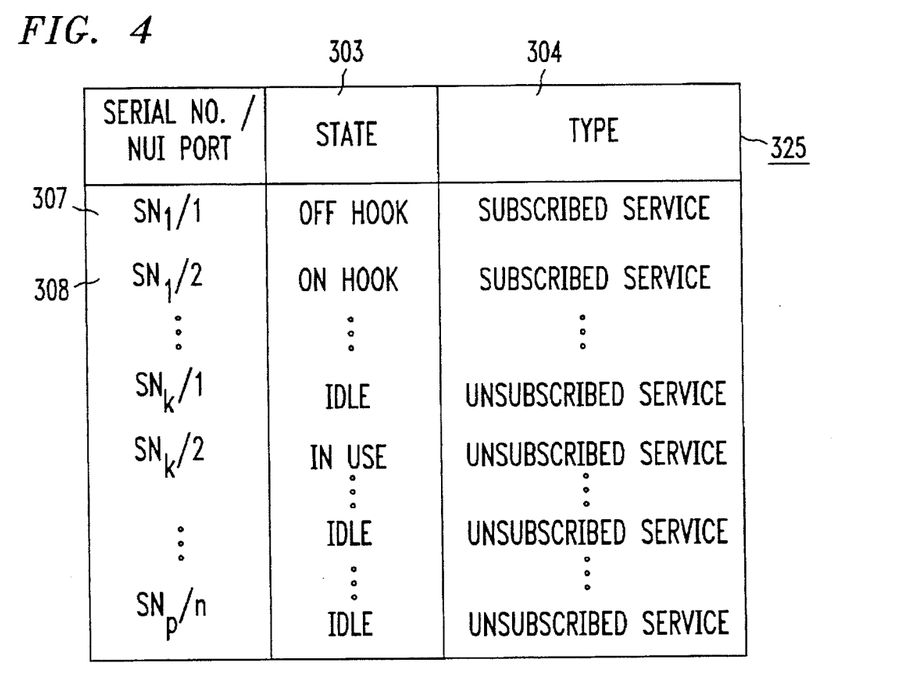
FIG. 4 illustrates a table that may be used to track the status of a port of a NIU.

The operating status of a port, e.g., port SN1/1, is tracked using status table 325 which is stored in the memory of the associated switch 100. For example, the contents of fields 303 and 304 of entries 307 and 308 of table 325, FIG. 4, indicates that ports 1 and 2 of NIU SN 1 are associated with subscribed telephone lines and have a current state of "off-hook" (busy) and "on-hook" (idle), respectively. The other entries of table 325 similarly track the status of other NIUs.

Returning to FIG. 2, access system 125-1 in the processing of a received telephone call inserts the CRV value obtained from the table 300 translation into a call set-up message and then sends the message to switch 100 via path 101-1. Switch 100, responsive to receipt of the message, generates the OE number using the received CRV value, identity of access system 125-1 and identity of the switch 100 trunk (port) that will be used to communicate the associated call over path 101-1. Switch 100 then maps the OE value into a telephone number associated with that OE. Switch 100 then obtains a conventional service record associated with the telephone number, in which the service record specifies, inter alia, the type of service (i.e., active or soft dial tone), service features (e.g., call waiting), etc. If the record shows that the telephone number is associated with soft-dial-tone service, then switch 100 restricts calls originating from that telephone number to a predetermined set of destination telephone numbers, e.g., 911 (emergency) and 611 (telephone service center), as mentioned above.

Figure 5:
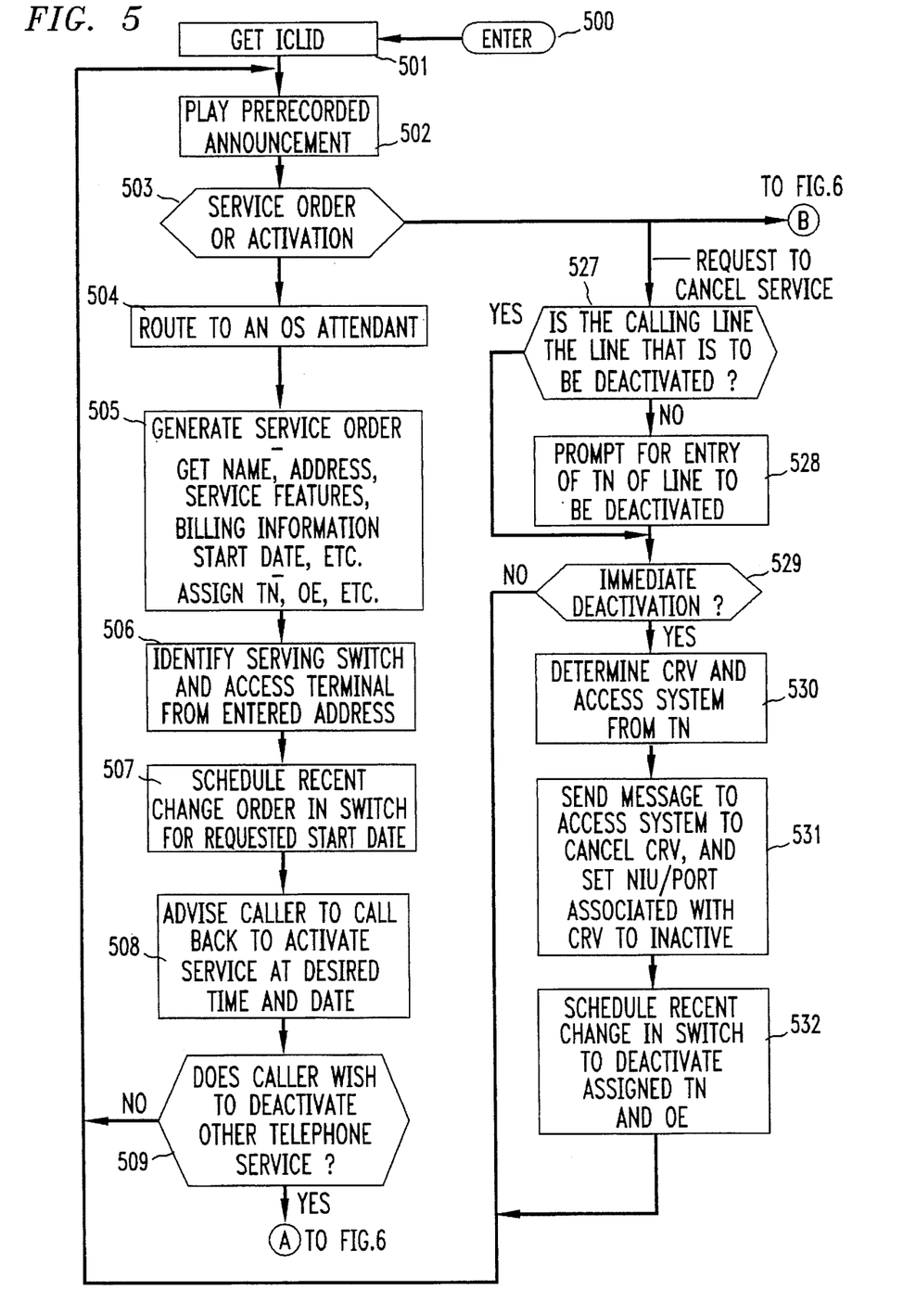
FIGS. 5 and 6 illustrate in flow chart form the program which implements the invention in the operations system of FIG. 2.

With the foregoing in mind, we now discuss the way in which our invention may be used to dynamically provision telephone service. In doing so, reference will be made to FIG. 2 and FIGS. 5 and 6, which illustrate in flow chart form the program which implements various aspects of the invention in OS 150.

Specifically, assume that a telephone subscriber associated with station set Sn (FIG. 2) is moving to a living unit that is served by access system 125-1 and NIU 110-m. Also assume that prior to the move, the subscriber places a call via NIU 110-n to the local telephone service center (i.e., telephone number 611) to cancel the subscriber's current telephone service and to order telephone service for line 111-m. As a result of the call, the subscriber is connected to OS 150 (block 500), which uses a so-called InComing Line IDentification (ICLID) value to determine the telephone number of the telephone line that the subscriber is calling from (block 501). OS 150 then returns a voice announcement (block 502) prompting the caller to select one of a number of announced OS 150 service order functions, such as a request (a) to modify current telephone service, (b) for new service (including activation of a previously ordered service), (c) to cancel telephone service, etc. Assume at this point (and as set forth above) that the subscriber selects menu item 'b', then OS 150 (block 503) further determines, by way of another announcement, if the user has already entered an order for telephone service and wishes to now activate that service. Assume at this point that the subscriber answers in the negative, then OS 150 routes (block 504) the subscriber's call to a service attendant, who proceeds to enter the subscriber's service request (order) as is done conventionally (block 505). The program then uses the street address contained in the service order (block 506) to identify the switch and access system (e.g. switch 100 and access system 125-1) that will be serving the subscriber. The program may do this by accessing conventional OS records which identify the switch and access system serving a particular street address. Having identified the switch and access system that will provide the subscriber's new service, then OS 150 (block 507) generates a Recent Change order characterizing the new service in switch 100, in which the order includes the telephone number of the new service and associated OE. Note that the contents of the CRV field of the OE may be randomly chosen by OS 150 as long as it is a number unique within access system 125-1 and is within the range of telephone lines supported by access system 125-1. This Recent Change request is entered into switch 100 in a conventional manner and at a time commensurate with the service date requested by the subscriber. The program then advises the subscriber (block 508) to "hang up" and then call telephone number 611 to activate the service, preferably from the telephone line that is to be activated.

At the completion of the service order, the subscriber (509) may request deactivation of the current service on line 111-m or be returned to the OS 150. In the latter case, OS 150 returns the subscriber to the main menu (i.e. items (a), (b), or (c) described above). If the subscriber requests such deactivation, then the OS attendant confirms that the line to be deactivated is the line being used by the customer, i.e. the TN obtained by ICLID is the TN of the line to be deactivated. If this is not the case, then the OS attendant requests that the caller enter the telephone number of the line to be deactivated and the deactivation date (block 511, FIG. 6). The OS attendant then schedules (block 512) a recent change order for execution by switch 100 and access system 125-1 (serving station Sm) on the date requested by the subscriber. The OS attendant then terminates the subscriber's call, as represented by block 513.

If the subscriber, on the other hand, responds to item (c) (i.e., deactivate service), then OS 150 (block 527) prompts the caller to determine if the service that is to be deactivated is associated with the telephone number (telephone station) from which the subscriber is currently calling. If the subscriber answers in the negative, then OS 150 requests that the subscriber enter (i.e., dial) the telephone number of the telephone line that is to be deactivated (block 528). OS 150 then "plays back" a verbal rendition of the entered number as a way of confirming the subscriber's entry. OS 150 then confirms (block 529) the subscriber's request of immediate deactivation of telephone service. OS 150 (block 530) then consults its associated memory records to identify the switch and access system serving the telephone line that is to be deactivated. Assuming that the telephone line is associated with switch 100 and access system 125-2, then OS 150 determines the CRV associated with that telephone line. OS 150 then generates (block 531) a recent change order and sends the order to access system 125-2, via link 152-2, requesting that the NIU serial number and port associated with the CRV of the line to be deactivated be mapped into the unsubscribed (or common) CRV that is associated with soft dial tone. OS 150 then schedules a recent change in the associated switch 100 to remove the telephone number and OE number of the line that is being deactivated (block 532) from the switch 100 memory records. The subscriber is then returned to the main menu (block 502).

Assuming that the subscriber answers the service activation request (block 503) in the affirmative, then OS 150 asks if the caller is currently calling from the line that is to be activated. If the answer is negative, then the call is terminated (block 516). If the answer is affirmative, then OS 150 (block 517) determines from its database records the identity of the access system serving the line that the subscriber wishes to activate, as well as the CRV assigned to soft-dial-tone for the access system. Assuming that OS 150 identifies access system 125-1, then OS 150 (block 518) sends a query containing the soft-dial-tone CRV thereto via communications link 152-1. The query also contains a request for the identity of the NIU and port originating the current call. Access system 125-1, responsive to the query, returns via path 152-1 the requested information, which OS 150 then uses to determine the street address (block 519) served by the identified NIU and associated port. OS 150 (block 520) then verifies this street address with the subscriber. If the address is not correct, then it is flagged so that it may be corrected at a future time. OS 150 then prompts the subscriber to dial the telephone number assigned to the line that is to be activated (block 521). OS 150 then uses the entered telephone number (TN) as a key to associate the subscriber's request with the previously assigned CRV (i.e., assigned at block 505). OS 150 (block 523) then sends a message to access system 125-1 to change the CRV associated with the identified NIU and port to the newly assigned CRV at the completion of the current call between OS 150 and the subscriber. As a result thereof, the CRV is changed from an identifier that is associated with unsubscribed service (i.e., a common identifier) to a CRV identifier associated with subscribed service. OS 150 then terminates the call (block 524). Upon receipt of a message from system 125-1 acknowledging the successful completion of the recent change issued by OS 150, OS 150 (block 525) dials the telephone number of the newly-activated telephone service to inform the subscriber that the service has been activated and to confirm such for its own records. OS 150 (block 526) then exits as a way of terminating the confirmation call.

The case may arise in which the subscriber may be placing a service order from an unsubscribed telephone line that the subscriber wants to activate. In that case then, the creation of the service order proceeds as described above. However, the OS 150 attendant may determine from the caller's telephone number (identified by OS 150 via the aforementioned ICLID feature) that the status of the calling line is currently marked inactive (unsubscribed). The OS 150 attendant may then query the subscriber to determine if the current telephone line is to be activated immediately. If so, then OS 150 "marks" the service order for immediate execution. OS 150 then generates, in a conventional manner, a recent change order and schedules the order for immediate execution in switch 100. OS 150 also schedules a similar order for immediate execution in the pertinent access system, e.g., AS 125-1. Thus, in accord with an aspect of the invention, the requested telephone service is dynamically activated commensurate with the subscriber's request for service.

Figure 6:
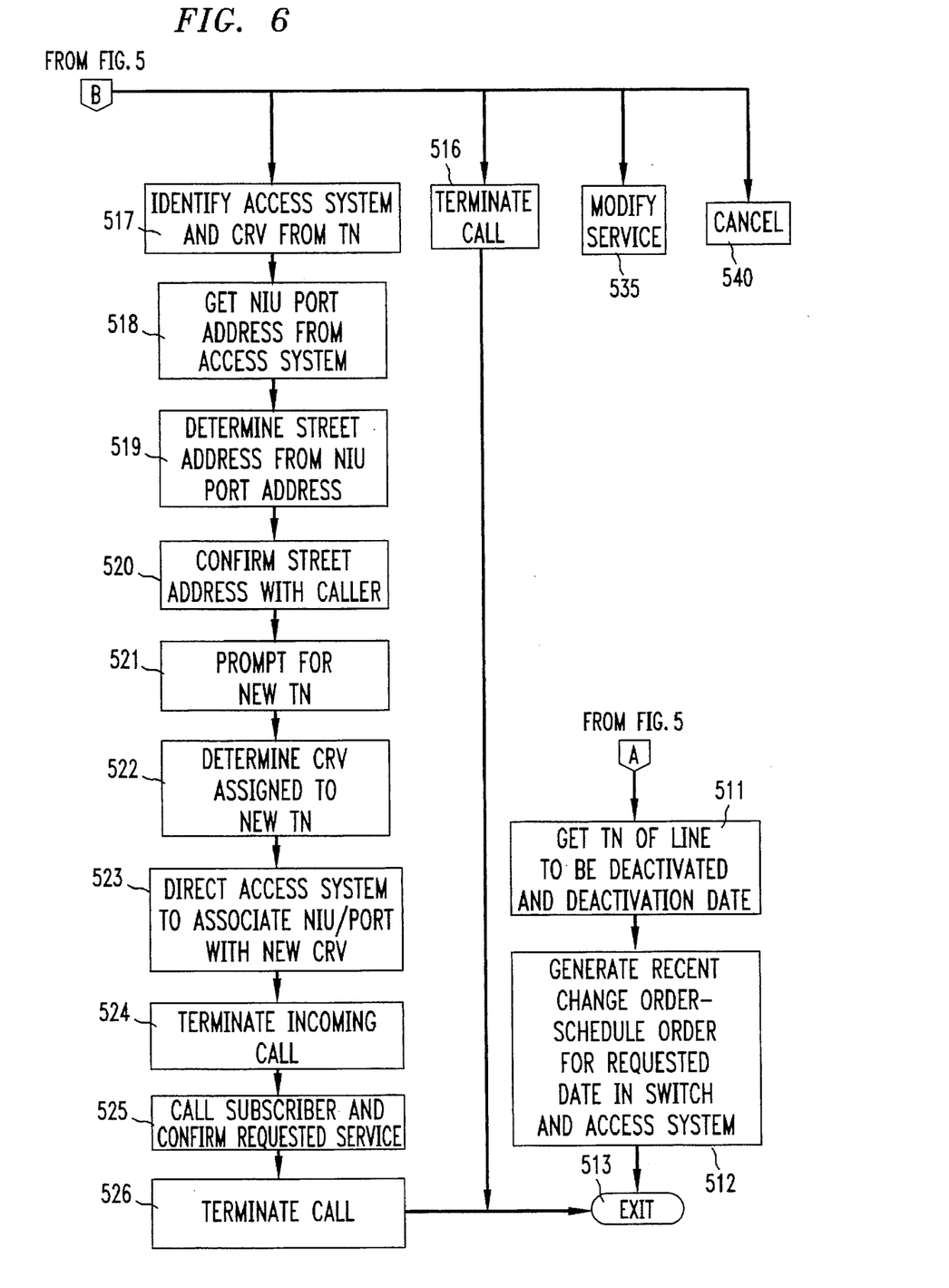

FIG. 6 illustrates block 535, which represents the program actions that OS 150 takes responsive to the subscriber respectively entering a request to modify an existing service.

As mentioned above, an NIU is associated with a number of port circuits, some of which may be inactive, i.e., having an unsubscribed status. This feature, together with the ability of OS 150 to dynamically provision telephone service, allows other variations in the provisioning of telephone service which previously were extremely difficult to implement. For example, a subscriber may request temporary telephone service via a second telephone line (i.e., another port of the associated NIU) and specify that the request is to be dynamically implemented within a relatively short period of time (e.g., one week or weekend). In addition, OS 150 may be adapted so that it automatically terminates the temporary telephone service at the end of the requested period of time.

Figure 7:
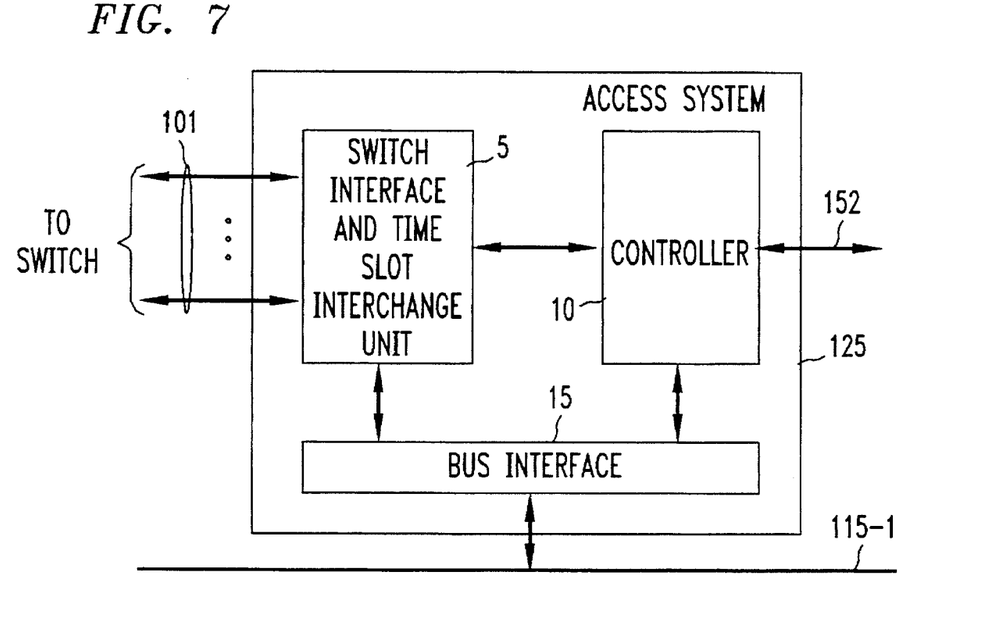
FIG. 7 is a broad block diagram of an access system of FIG. 2.

A broad block diagram of an access system 125 is illustrated in FIG. 7 and includes, inter alia, time slot interchange unit 5, controller 10 and bus interface 15 which interfaces units 5 and 10 with bus 115. Time slot interchange 5, more particularly, receives information (e.g., voice, data or information) via an individual channel of transmission media 101 and transfers the received information to a respective memory register associated with a particular output time slot of the associated bus 115. Such a time slot may be one that is assigned to a particular transaction, i.e., a telephone call. When the output time slot occurs, then time slot interchange unit 5 supplies the contents of the register (memory location) to the bus interface so that the information may be delivered during that time slot to its intended destination via bus 115 and a particular NIU 110 identified by the information. Time slot interchange unit 5 performs a similar function in the opposite direction. That is, time slot interchange unit 5 receives information via bus 115 and interface 15 during a particular time slot and stores the information in an incoming register associated with the time slot. The stored information is then supplied to a transmission channel of media 101 that is mapped to that time slot.

Call information that time slot interchange unit 5 receives via a media 101 signaling channel relating to an incoming call from switch 100 identifies the media 101 channel that will carry the associated call and the CRV identifying the intended recipient (called Party). Such information is passed to controller 10 via bus 9. Controller 10 identifies the NIU 110 and associated NIU port serving the called party as a function of the received CRV. Controller 10 also assigns the call to a bus 115 time slot and passes the identity of that time slot to time slot interchange unit 5.

Controller 10 also interfaces with OS 150 via bus 152 for the purpose of provisioning and administration of telephone services, in accord with the invention and in the manner discussed above.

Figure 8:
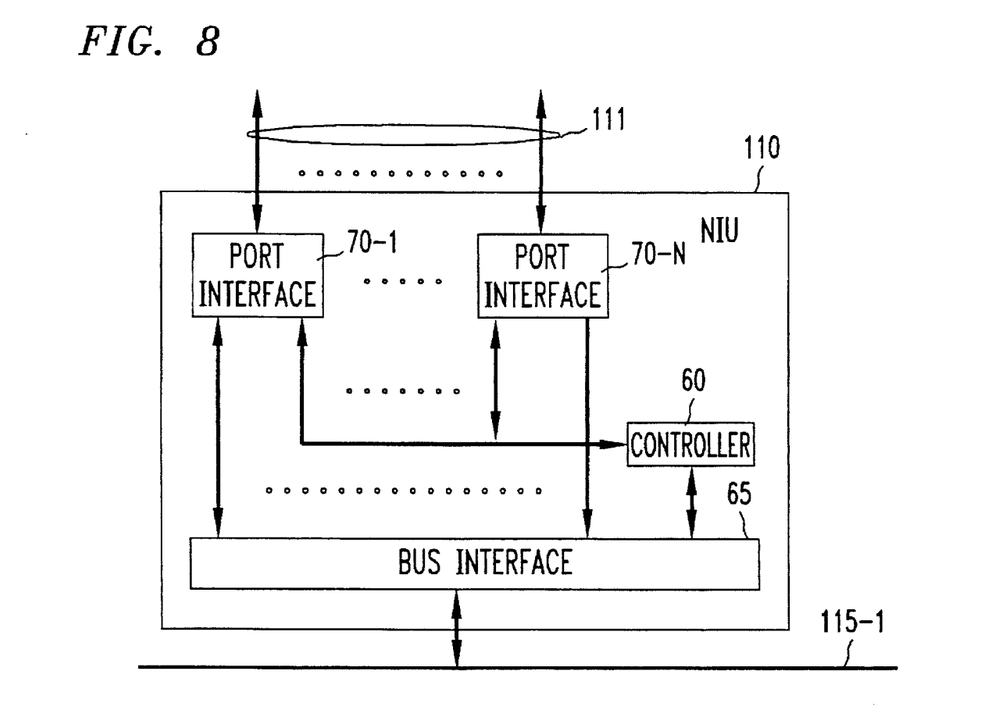
FIG. 8 is a broad block diagram of a NIU of a NIU of FIG. 2.

FIG. 8 is a broad block diagram of an NIU 110, which includes bus controller 60, interface 65 and a plurality of NIU port interface circuits 70-1 through 70-N for interfacing an NIU with respective telephone equipments, e.g., telephone lines. As mentioned above, a telephone subscriber may be associated with different telephone equipments, e.g., dataphone, video telephone, voice telephone, etc., each of which may be connected to a respective NIU port interface. Controller 60, more particularly, communicates with controller 10 of the associated access system 115 via a control channel (time slot) of bus 115. Such communications includes information relating to an incoming call via switch 100 and information which identifies the bus 115 channel (time slot) assigned to the call and the recipient (port circuit 70) of the call. Controller 60, in turn, passes the identity of the time slot carrying the call and identity of the port 70 that is to receive the call via the associated bus interface circuit 65. Thereafter, interface circuit 65 reads the information from bus 115 during the identified time slot and passes it to the identified port 70. In the opposite direction, a port 70 recognizes an off-hook condition initiated by a subscriber connected thereto and sends an indication thereof to controller 60. Controller 60, in turn, sends a message containing an off-hook identifier, its identity, and the identity of the port circuit reporting the off-hook to controller 10 via the aforementioned control channel. Controller 10 then translates the identities contained in the message into a CRV and sends the latter to switch 100 via the media 101 signaling channel, as discussed above. In addition, controller 10 may assign a bus 115 time slot to the call and pass that assignment to the pertinent controller 60. Switch 100, upon receipt of the controller 10 message, assigns a media 101 channel to the call and communicates that assignment to controller 10 via the aforementioned signaling channel. Controller 10 may then process information originating from the opposite ends of the call in the manner discussed above.

When either end of the call "hangs up" then that event is communicated to controller 60 which then terminates the call by notifying its associated interface 65 to terminate its reading of bus 115 during the time slot assigned to the call. The call is terminated in similar manner at access system 125.

The foregoing is merely illustrative of the principles of the invention. Those skilled in the art will be able to devise numerous arrangements, which, although not explicitly shown or described herein, nevertheless embody those principles that are within the spirit and scope of the invention. For example, a telephone switch, e.g., switch 100, is typically arranged to allow only one telephone call to be associated at a given time with a unique OE. What this means is that if a call is in progress via a telephone line having a soft-dial-tone status, then switch 100 will reject call attempts from other lines having the same status and served by the same access system. We deal with this problem by populating table 300 with a plurality of CRVs for telephone lines having a soft-dial-tone status and assigning those CRVs to those lines as needed, thereby allowing restricted calls to be placed at the same time via a plurality of unsubscribed telephone lines.

We claim:

1. A method of processing a telephone call received from an unsubscribed telephone line served by an access system, said access system interfacing said unsubscribed telephone line with a telecommunications switch, said telecommunications switch being one of a plurality of telecommunications switches forming a telephone network, said method comprising the steps of responsive to receiving a request for telephone service from said unsubscribed telephone line, associating said request with a first identifier common to an associated group of unsubscribed telephone lines served by said access system, forming a message containing said first identifier and sending said message to said telecommunications switch, and at said telecommunications switch, translating at least said first identifier into a particular telephone number associated with restricted telephone-dialing service such that a subsequent telephone call originating over said unsubscribed telephone line can only be placed to one of a group of predetermined telephone numbers.

2. The method of claim 1 further comprising the steps of responsive to receiving a request for telephone service from a subscribed telephone line, forming another message containing a second identifier and sending said other message to said telecommunications switch, and at said telecommunications switch, translating at least said second identifier into a telephone number associated with unrestricted telephone-dialing service.

3. The method of claim 1 wherein said group of predetermined telephone numbers includes a telephone number associated with a local telephone company service center and responsive at said access system to receipt of a telephone call from said unsubscribed telephone line to said service center, establishing a telephone connection between said unsubscribed telephone line and a telephone operations system.

4. The method of claim 3 further comprising the steps of in said telephone operation system, responsive to receipt via said unsubscribed telephone line of the request to associate said unsubscribed telephone line with subscribed telephone service, supplying to said telecommunications switch a recent change order containing a request to change the status of said unsubscribed telephone line to subscribed telephone service and further containing at least a unique telephone number and unique identifier that are to be associated with said unsubscribed telephone line after said status is changed to said subscribed telephone service, in said telecommunications switch, executing said order for said subscribed telephone service at a date and time specified in said order by changing said status to subscribed telephone service and associating said unique identifier with said unique telephone number, and in said access system associating said unsubscribed telephone line after its status has been changed with said unique identifier such that the unsubscribed telephone line becomes a subscribed telephone line.

5. The method of claim 4 further comprising the steps of in said operation system, responsive to receipt via said subscribed telephone line of a subsequent request to deactivate said subscribed telephone service, supplying to said telecommunications switch a recent change order containing a request to change the status of said subscribed telephone line to unsubscribed telephone service and further containing at least said particular telephone number and said first identifier that are to be associated with said subscribed telephone line when said status is changed to unsubscribed telephone service, in said telecommunications switch, executing said order for unsubscribed service at a date and time specified in said order for unsubscribed service by changing said status to unsubscribed telephone service and associating said first identifier with said particular telephone number, and in said access system, executing said order for unsubscribed service at said date and time by disassociating said unique telephone number with said unique identifier and then associating said telephone line that now has a status of unsubscribed service with said first identifier.

6. The method of claim 5 further comprising the steps of in said operation system, responsive to receipt of another subsequent request containing a request to change the status of another, different unsubscribed telephone line to subscribed telephone service, supplying to said telecommunications switch another recent change order containing a request to change the status of said other unsubscribed telephone line to subscribed telephone service and further containing at least a second unique telephone number and second unique identifier that are to be associated with said other unsubscribed telephone line when the status of said other unsubscribed telephone line is changed, in said telecommunications switch, executing said other recent change order for said other unsubscribed telephone line at a date and time contained in the other recent change order by changing said status of said other unsubscribed telephone line to subscribed telephone service and associating said second identifier with said second telephone number, and in said access system, executing said other recent change order at said date and time by disassociating said other unsubscribed telephone line with said first identifier and associating said other unsubscribed telephone line with said second unique identifier.

7. A method of processing a telephone call in a telecommunications network comprising the steps of responsive to receipt of a request for service over a telephone line, associating said telephone line with either a first or second identifier based on said telephone line having either a subscribed or unsubscribed status, respectively, in which said first identifier is unique to said telephone line and said second identifier is common to a group of unsubscribed telephone lines, and restricting said telephone line to placing a telephone call to one of a group of predetermined telephone numbers if said telephone line is associated with said second identifier and not so restricting said telephone line if said telephone line is associated with said first identifier.

8. The method of claim 7 further comprising the steps of responsive to said telephone line being associated with said first identifier, forming a message containing said first identifier and sending said message to an associated telecommunications switch, and at said associated telecommunications switch, translating at least said first identifier into a telephone number associated with unrestricted telephone-dialing service.

9. The method of claim 7 wherein said group of telephone numbers includes a telephone number associated with a local telephone company service center and wherein said method further comprises the step of responsive to the placing of a telephone call from one of said unsubscribed telephone lines to said service center, establishing a telephone connection between said one of said unsubscribed telephone lines and a telephone operations system.

10. The method of claim 9 further comprising the steps of in said operation system, responsive to receipt of a request to associate said one unsubscribed telephone line with subscribed telephone service, supplying to an associated telephone switch a recent change order containing a request to change the status of said one unsubscribed telephone line to subscribed telephone service and further containing at least a unique telephone number and unique identifier that are to be associated with said one unsubscribed telephone line when said status of said one unsubscribed telephone line is changed, in said associated switch, executing said order at a date and time contained in said order by changing said status of said one unsubscribed telephone line to subscribed telephone service and associating said unique identifier with said unique telephone number, and in said access system, interfacing said telephone line now having a status of subscribed telephone service with said associated switch by associating that said subscribed telephone line with said unique identifier.

11. The method of claim 10 further comprising the steps of in said operation system, responsive to receipt via said subscribed telephone line of a subsequent request to deactivate said subscribed telephone service, supplying to said associated switch another recent change order containing a request to change the status of said subscribed telephone line to unsubscribed telephone service and further containing at least said second identifier that is to be associated with said telephone line when said status is changed to unsubscribed telephone service, in said associated switch, executing said other recent change order containing said request to change the status of said subscribed telephone line to unsubscribed telephone service at a date and time contained in said other recent change order by changing said status of said subscribed telephone line to unsubscribed telephone service and associating said second identifier with a predetermined telephone number, and in said access system, executing said other recent change order containing said request to change the status of said subscribed telephone line to unsubscribed telephone service at said date and time by disassociating said subscribed telephone line with said first identifier and then associating said subscribed telephone line with said second identifier.

12. The method of claim 11 further comprising the steps of in said operation system, responsive to receipt of another subsequent request containing a request to change the status of another, different unsubscribed telephone line to subscribed telephone service, supplying to said telephone switch a recent change order containing a request to change the status of said other unsubscribed telephone line to subscribed telephone service and further containing at least a second unique telephone number and third identifier that are to be associated with said other unsubscribed telephone line when the status of said other unsubscribed telephone line is changed, in said switch, executing said subsequent recent change order for said other unsubscribed telephone line at a date and time contained in said subsequent order by changing said status of said other unsubscribed telephone line to subscribed telephone service and associating said third identifier with said second telephone number, and in said access system, executing said subsequent recent change order for said other unsubscribed telephone line at said date and time by disassociating said other unsubscribed telephone line with said second identifier and associating said other unsubscribed telephone line with said third identifier such that the unsubscribed telephone line becomes a subscribed telephone line.

13. A method of automatically provisioning telephone service in a telecommunications system comprising a plurality of switches and access systems, each of said access systems being operative for interfacing a plurality of telephone lines with a respective one of said switches, said telephone lines including subscribed and unsubscribed telephone lines, said method comprising the steps of responsive to receipt of a call from a caller over a first one of said telephone lines and to said caller entering a request for telephone service, automatically prompting said caller to enter at least a street address associated with a second one of said telephone lines that is to identified with said requested telephone service, identifying as a function of the entered address which one of said access systems and switches serve said second one of said telephone lines, associating the requested service with a unique telephone number scheduling a recent change order defining the requested service for execution in the identified switch at a date and time specified by the caller, said change order including said telephone number and a unique call reference value that are to be associated with said identified telephone line, and activating the requested service at the specified date and time, and wherein said identified telephone line connects to said identified access system via a port circuit of an interface unit which interfaces said identified telephone line and other ones of said telephone lines with said identified access system and wherein said step of activating includes the steps of prompting said caller to enter said unique telephone number and determining said unique reference value as a function of the entered telephone number, and directing said access system to associate said call reference value with said port address to activate the requested service.

14. The method of claim 13 wherein said requested service is activated for a duration of time specified by said caller, in which said specified duration includes a time and date at which said requested service is to be deactivated and wherein said method includes the step of automatically deactivating said activated service at the time and date specified for said deactivation.

15. A method of deactivating telephone service in a telecommunications system including an access system for interfacing a plurality of telephone lines with an associated switch of said telecommunications system, said telephone lines including subscribed and unsubscribed telephone lines, said method comprising the steps of responsive to receipt of a call from a caller over one of said telephone lines in which said caller enters a request to deactivate an existing telephone service associated with a second one of said telephone lines, determining a particular telephone number associated with said second one of said telephone lines, determining a call reference value associated with said particular telephone number, directing said access system to change the determined call reference value to an inactive call reference value as a way of associating said second one of said telephone lines with unsubscribed telephone service, and scheduling a recent change order defining the requested deactivation for execution in the associated telecommunications switch, said change order including said particular telephone number and the determined call reference value associated with said particular telephone number.

16. The method of claim 15 further comprising the step of in said switch, executing the change order by disassociating said particular telephone number and an associated originating equipment number from said second one of said telephone lines to complete the deactivation.

17. The method of claim 15 wherein said first one of said telephone lines is said second one of said telephone lines.

* * * * *